United States Patent [19]
Glennon

[11] Patent Number: 5,805,394
[45] Date of Patent: Sep. 8, 1998

[54] OVERVOLTAGE PROTECTION CIRCUIT FOR A GENERATING SYSTEM UTILIZING A FAULT CURRENT SENSING CIRCUIT IN COMBINATION WITH A SHUNTING CIRCUIT

[75] Inventor: Timonthy F. Glennon, Rockford, Ill.

[73] Assignee: Sundstrand Corporation, Rockford, Ill.

[21] Appl. No.: 877,171

[22] Filed: Jun. 17, 1997

[51] Int. Cl.⁶ ................................................. H02H 7/06
[52] U.S. Cl. ................................. 361/20; 361/21; 361/30; 361/47; 361/55; 361/56; 322/37
[58] Field of Search .................. 361/20, 21, 30, 361/47, 52, 55, 56; 322/11, 12, 25, 37

[56] References Cited

U.S. PATENT DOCUMENTS

| | | | |
|---|---|---|---|
| 3,314,001 | 4/1967 | Brockman | 322/73 |
| 3,705,331 | 12/1972 | South et al. | 317/13 |
| 3,745,442 | 7/1973 | Gynn | 322/24 |
| 3,835,367 | 9/1974 | Wiley | 322/28 |
| 3,904,931 | 9/1975 | Leidich | 317/16 |
| 3,931,546 | 1/1976 | Jakobs et al. | 317/16 |
| 3,943,408 | 3/1976 | Jakobs et al. | 317/13 R |
| 3,992,649 | 11/1976 | Kotheimer et al. | 317/26 |
| 4,401,936 | 8/1983 | van Opijnen | 320/59 |
| 4,442,396 | 4/1984 | Hucker | 322/21 |
| 5,047,890 | 9/1991 | Kessler | 361/93 |
| 5,164,874 | 11/1992 | Okano et al. | 361/56 |
| 5,528,444 | 6/1996 | Cooke et al. | 361/20 |
| 5,552,952 | 9/1996 | Krammer et al. | 361/86 |

Primary Examiner—Jeffrey A. Gaffin
Assistant Examiner—Kim N. Huynh
Attorney, Agent, or Firm—Marshall, O'Toole, Gerstein, Murray & Borun

[57] ABSTRACT

An overvoltage protection circuit utilizes the fault current sensing capabilities of a differential protection circuit in combination with a shunting circuit to protect a power generating system against an overvoltage condition. The circuit offers the combined advantage of protecting attached load equipment from the harmful effects of an overvoltage condition while also ensuring rapid deexcitation of a generator.

20 Claims, 3 Drawing Sheets

OVERVOLTAGE PROTECTION CIRCUIT FOR A GENERATING SYSTEM UTILIZING A FAULT CURRENT SENSING CIRCUIT IN COMBINATION WITH A SHUNTING CIRCUIT

TECHNICAL FIELD

The present invention relates generally to protection circuits and, more particularly, to protection circuits that protect connected load equipment against an overvoltage condition.

BACKGROUND ART

Differential protection circuitry is often employed in power supply systems to sense and respond to adverse current fault conditions. The protection circuitry is positioned to protect a portion of the system referred to in the art as the differential protection zone and includes sensors that monitor the current flow at the first and second boundaries of the zone. An abnormal current condition within the zone, created, for example, by a short circuit, causes the current flow between the zone boundaries to differ. The sensors, in response to the sensed differential current, actuate means to mitigate the fault current condition. Such protection is especially advantageous where rapid response to fault current conditions is crucial. For example, early response to an abnormal current condition will often prevent arcing or wire fires which are particularly hazardous in locations near the combustible jet fuel tanks aboard an aircraft.

Although differential protection circuits respond to fault current conditions, they do not protect against overvoltage conditions because such conditions do not typically result in a differential current between zone boundaries. Therefore, additional protective circuitry is typically required to minimize the effects of an overvoltage condition in a differential protection zone. Such an overvoltage condition can arise, for example, when a voltage regulator in a brushless, synchronous generator fails in a full-on condition, causing exciter current to rise substantially above required levels. In a typical aircraft or aerospace constant frequency application where load voltage is not to exceed 180 volts and where a variable-frequency machine experiences speed variations over a 2:1 speed range, a voltage magnitude of 360 volts can be developed when the voltage regulator fails in the full-on condition.

Traditional methods of protecting connected load equipment from an overvoltage condition occurring at the output windings of a generator involve shunting or otherwise isolating the generator output windings. Generally, a controlled rectifier switch is used to shunt the output current, thereby preventing the connected load equipment from experiencing the overvoltage. A representative system is described in Jakobs et al., U.S. Pat. No. 3,943,408, Okano et al., U.S. Pat. No. 5,164,874, discloses a shunting circuit operating in combination with a fuse. The shunting circuit responds to transient overvoltage conditions by shunting the output windings and the fuse responds to the resulting overcurrent condition of a longer duration by disconnecting the generator output winding from the connected load.

Although the prior art discloses methods for protecting against overvoltage and overcurrent conditions, it does not describe a differential protection function that provides both overcurrent and overvoltage protection.

SUMMARY OF THE INVENTION

In accordance with the present invention, overvoltage protection capability is provided through the action of a differential protection circuit for a power generating system.

More particularly, according to one aspect of the present invention, a circuit that protects a load coupled to a power supply system includes first and second differential current protection sensors that are adapted to sense current magnitudes at first and second boundaries of a differential protection zone. The circuit further includes a control circuit that responds to the first and second differential current sensors to disable a generator of the power supply system in the event that a differential current condition is detected. A controllable switching element is coupled to the conductor at a point within the differential protection zone and is further coupled at a second end to a source of potential. Means are coupled to the controllable switching element and the generator for rendering the controllable switching element conductive in response to a generator overvoltage to connect the generator to the source of potential and thereby limit load voltage and cause a differential current condition to arise.

The protective circuit of the present invention utilizes the fault current sensing capabilities of a differential protection circuit in combination with a shunting circuit to protect a power generating system against an overvoltage condition. The circuit offers the combined advantage of protecting attached load equipment from the harmful effects of an overvoltage condition while also ensuring rapid deexcitation of the generator. Such protection is especially advantageous where rapid response to overvoltage conditions is crucial to protect load equipment which could be damaged by overvoltage.

DESCRIPTION OF THE PREFERRED EMBODIMENT

Figure 1:
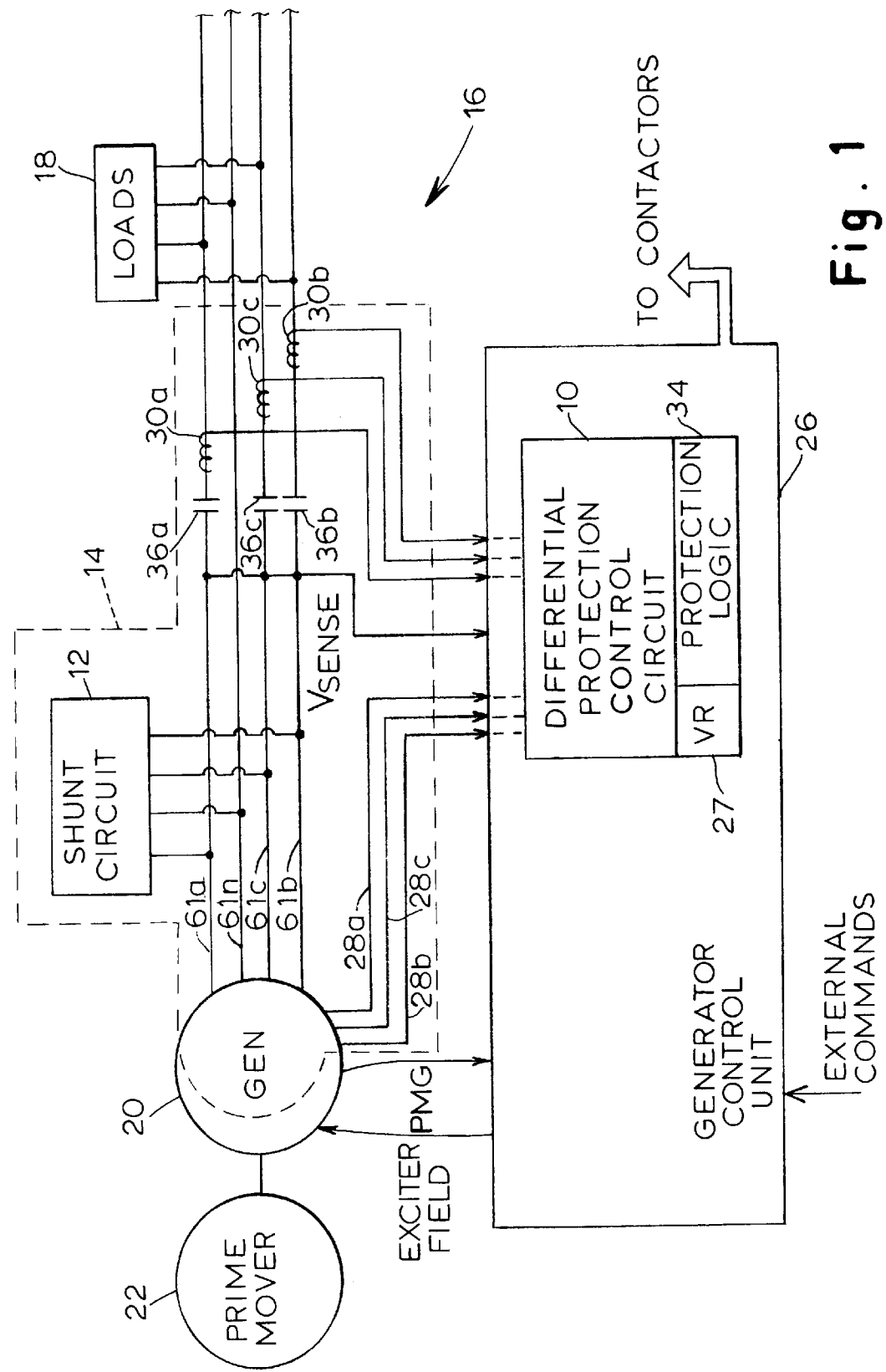
FIG. 1 comprises a block diagram of a power generating system incorporating the present invention.

Referring now to FIG. 1, a differential protection control circuit 10 acting in combination with a shunt circuit 12 protects a differential protection zone 14 of a power generating system 16 and one or more connected loads 18. The power generating system 16 includes a generator 20, preferably of the brushless, synchronous type, which is coupled to and driven by a prime mover in the form of an aircraft jet engine 22. The differential protection control circuit 10 forms a part of a generator control unit (GCU) 26, which also includes a voltage regulation (VR) circuit 27 and current limiting capability.

Figure 3:
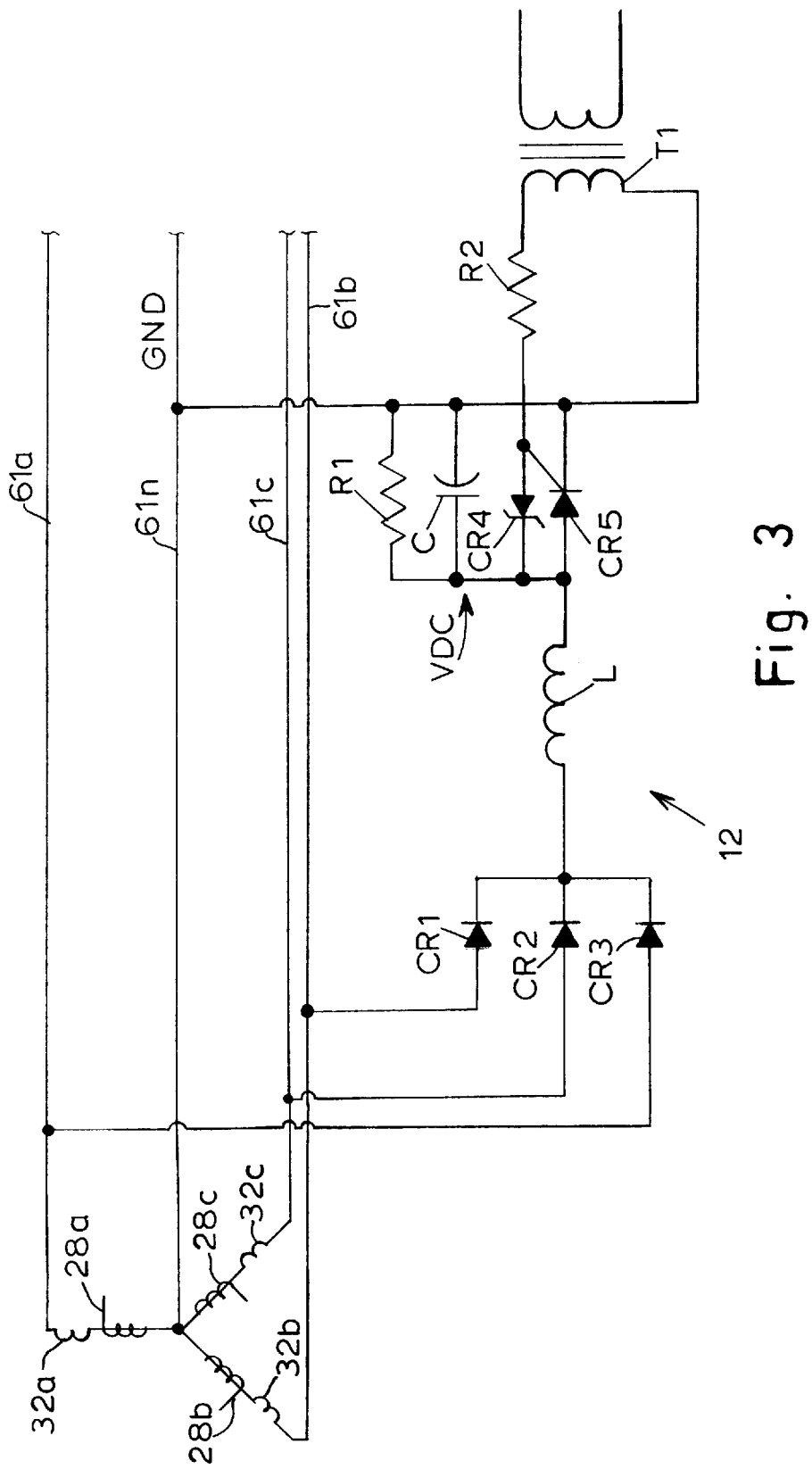
FIG. 3 comprises a schematic of the shunt circuit of FIGS. 1 and 2.

Referring also to FIG. 3, the boundaries of the differential protection zone 14 are defined by the locations of the two sets of differential protection sensors 28a–28c, 30a–30c adapted to sense current magnitudes. Each sensor of the set 28 comprises a current transformer sensing current in one of a set of polyphase main armature windings 32a–32c of the generator 20. The sensor set 28a–28c is disposed in the generator 20 (as seen in FIG. 3). Each sensor of the set 30 comprises a current transformer sensing the current in the load bus connected to the load(s). The differential protection control circuit 10 utilizes the outputs of the current sensors 28a–28c, 30a–30c to monitor current flow through the differential protection zone 14. An abnormal current condition caused, for example, by a short circuit occurring within the zone boundaries will cause a difference in the magnitudes of current sensed at the zone boundaries. Upon sensing a differential current magnitude, the differential protection control circuit 10 relays a command signal to the protection logic 34 of the GCU 26 to open controllable contactors 36a–36c and thereby disconnect the generator 20 from the load(s) 18. In addition, the voltage regulation circuit 27 is commanded to deexcite the generator 20 in the fashion noted in greater detail hereinafter. Thus, the power generating system 16 is quickly isolated from the load(s) in the event of a differential fault condition, thereby limiting the risk of arcing, wire fires and load damage.

The shunt circuit 12 connected to the generator main armature windings 32a–32c responds to an overvoltage condition by shunting the main armature windings 32a–32c to ground or neutral potential. The shunting operation induces a differential current within the differential protection zone 14 which, in turn, triggers the protective actions of the differential protection control circuit 10. Thus, by placing the shunt circuit 12 within the differential protection zone 14, the differential protection control circuit 10 responds to overvoltage conditions as well as differential fault conditions.

Figure 2:
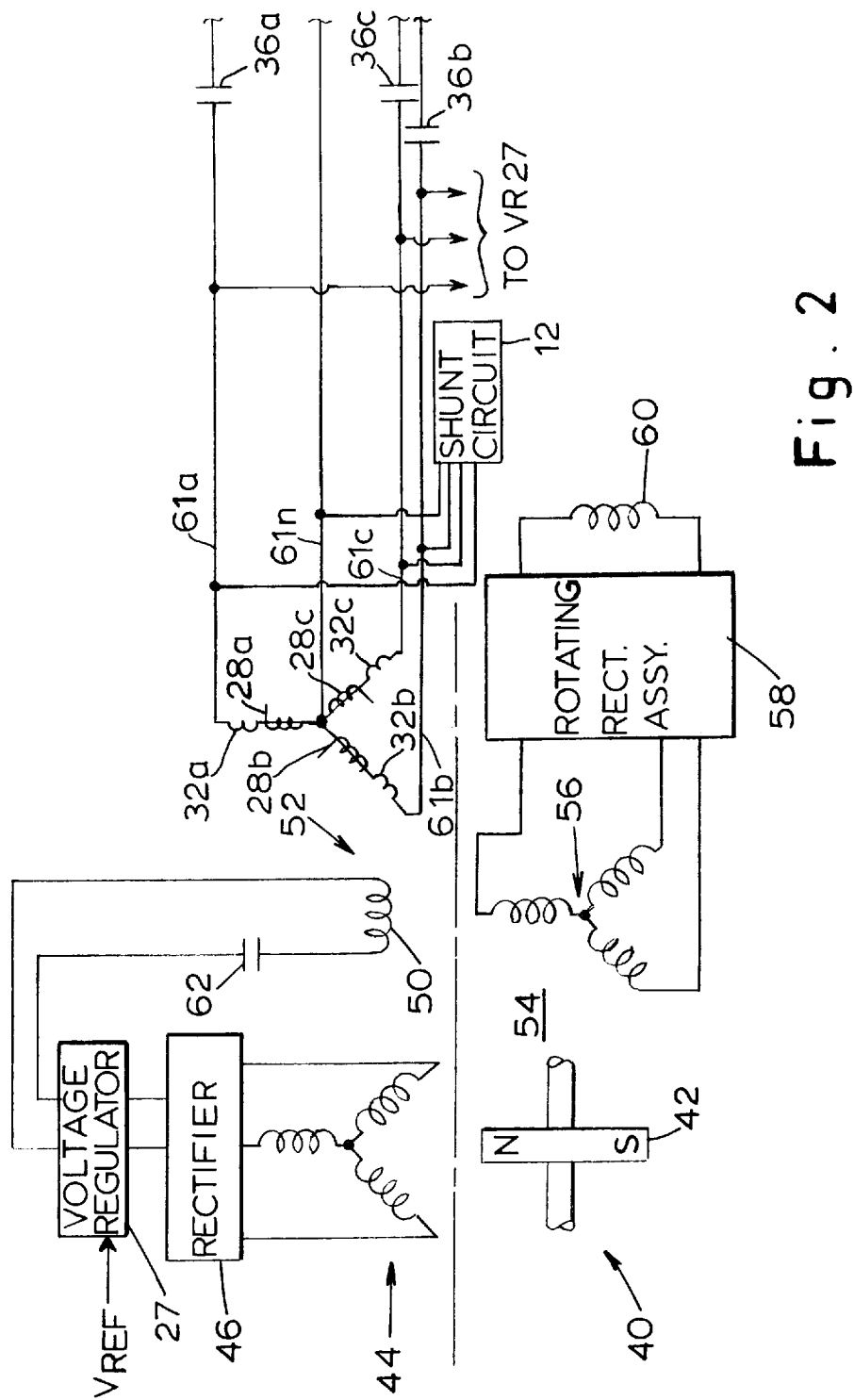
FIG. 2 comprises a combined schematic and block diagram of the generator and shunt circuit of FIG. 1.

Referring now to FIG. 2, the generator 20 includes a permanent magnet generator (PMG) portion 40 including a permanent magnet rotor assembly 42 and a set of PMG armature windings 44 in which control power is developed. The PMG armature windings 44 are coupled through a rectifier assembly 46 and the voltage regulation circuit 27 to a field winding 50 of an exciter portion 52. Rotation of a rotor 54 of the generator 20 as field current is flowing in the exciter field winding 50 induces a three-phase voltage in the three-phase armature windings 56 of the exciter portion 52. The AC power induced in the exciter armature windings is converted into DC power by a rotating rectifier assembly 58 and is supplied to a main generator field winding 60. Rotation of the rotor while current is flowing in the field winding causes three phase voltages to be induced in the main armature windings 32a–32c.

The voltage regulation circuit 27 senses the three phase line AC voltages at a particular point, for example at the generator line contactors (GLC's) 36a–36c coupled to feeders or conductors 61a–61c, compares such voltage against a reference voltage $V_{REF}$ and modulates the flow of control power to the exciter field winding to regulate the ouput voltage of the generator 20. A contactor 62 connected between the voltage regulation circuit 27 and the exciter field winding 50 is controlled by the GCU protection logic 34. In the event of a fault current condition, the differential protection control circuit 10 of FIG. 1 commands the GCU protection logic 34 to open the contactor 62, thereby causing generator 20 deexcitation.

With reference again to FIG. 3, a half-wave rectifier circuit implemented by three diodes CR1–CR3 is coupled to the generator main armature windings 32a–32c or is connected at any point in the feeders 61a–61c before the GLC's 36a–36c. Alternatively, a full-wave rectifier circuit may be utilized. A current shunting mechanism is realized by a zener diode CR4 and a silicon controlled rectifier (SCR) CR5 which are coupled to the half-wave rectifier by an inductor L. A resistor R1 is coupled across the SCR CR5 and a voltage representative of the generator output voltage is developed thereacross. The zener diode CR4 is coupled between the anode and gate of the SCR CR5 and the cathode of CR5 is coupled to a generator neutral conductor 61n. If the voltage across the resistor R1 (representing generator output voltage) exceeds a predetermined voltage level of, for example, approximately 254 volts (representing the peak of 180 volt RMS generator output voltage), the zener diode CR4 is driven into conduction, thereby rendering the silicon controlled rectifier CR5 conductive. When CR5 is conductive the generator output windings are shunted to neutral (i.e., ground potential). The shunting operation protects attached load equipment from the harmful effects of an overvoltage condition and also induces a differential current fault within the boundaries of the differential protection zone 14. This differential fault condition is detected by the differential protection control circuit 10 (FIG. 1) which quickly responds to deexcite the generator 20 in the fashion noted above.

The resistor R1 and a capacitor C connected in parallel with the shunt mechanism filter spikes during normal generator operation and are preferably low power components. The inductor L limits the rate of change of current during turn on of the shunting mechanism.

A test circuit comprising a resistor R2 and a transformer T1 connected in series with the shunt mechanism may be provided for testing the shunt circuit operation. A pulse of suitable duration and polarity applied to the transformer T1 causes the gate of CR5 to fire (if the shunt mechanism is operable), thereby triggering the differential protection control circuit 10 as noted previously.

The entire shunt circuit 12 may be packaged on the generator 20 where the power semiconductors can be oil cooled or anywhere along the feeders 61a–61c. When an overvoltage condition occurs, the differential protection triggering typically results within 50 to 100 milliseconds, resulting in only limited losses in the components.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. A circuit for protecting a load coupled to a power supply system wherein the system includes a generator coupled by a conductor to the load, first and second differential current protection sensors adapted to sense current magnitudes at first and second boundaries of a differential protection zone and a control circuit responsive to the first and second differential current protection sensors to disable the generator when a differential current condition arises, comprising:

a controllable switching element coupled at one end to the conductor at a point within the differential protection zone and further coupled at another end to a source of potential; and means coupled to the controllable switching element and the generator for rendering the controllable switching element conductive in response to a generator overvoltage condition to connect the generator to the source of potential and thereby limit load voltage and cause a differential current condition to arise.

2. The circuit of claim 1, wherein the controllable switching element comprises a silicon controlled rectifier (SCR).

3. The circuit of claim 1, wherein the rendering means comprises a zener diode coupled to the controllable switching element.

4. The circuit of claim 3, further including a test circuit for testing operability of the controllable switching element.

5. The circuit of claim 4, wherein the test circuit comprises a transformer and a further resistor coupled to the controllable switching element.

6. The circuit of claim 1, further including a rectifier circuit coupled between the generator and the controllable switching element.

7. The circuit of claim 6, wherein the rectifier circuit is of the half-wave type.

8. The circuit of claim 1, wherein the rendering means includes a resistor across which a voltage representative of generator output voltage is developed.

9. The circuit of claim 8, further including a capacitor coupled across the resistor.

10. The circuit of claim 1, further including an inductor coupled in series with the controllable switching element.

11. A circuit for protecting a load coupled to a power supply system wherein the system includes a generator having a generator neutral and an output coupled by a conductor to the load, first and second differential current protection sensors adapted to sense current magnitudes at first and second boundaries of a differential protection zone and a control circuit responsive to the first and second differential current protection sensors to disable the generator when a differential current condition arises, comprising:

a rectifier circuit coupled to the generator output at a point within the differential protection zone;

a silicon controlled rectifier (SCR) coupled at one end to the rectifier circuit and further coupled at another end to the generator neutral;

a resistor coupled across the SCR and developing a voltage representative of generator output voltage; and means coupled to the SCR and the generator for rendering the SCR conductive in response to a generator overvoltage condition to connect the generator output to the generator neutral and thereby limit load voltage and cause a differential current condition to arise.

12. The circuit of claim 11, wherein the rendering means comprises a zener diode coupled to the SCR.

13. The circuit of claim 12, wherein the generator includes three output phases and the rectifier circuit is of the half-wave type including three diodes coupled to the three output phases.

14. The circuit of claim 13, further including a capacitor coupled across the resistor.

15. The circuit of claim 14, further including an inductor coupled in series with the SCR.

16. The circuit of claim 15, further including a test circuit for testing operability of the SCR.

17. The circuit of claim 16, wherein the test circuit comprises a transformer and a further resistor coupled to the SCR.

18. A circuit for protecting a load coupled to a power supply system wherein the system includes a polyphase generator coupled by phase conductors and a neutral conductor to the load, comprising:

first and second differential current protection sensors adapted to sense current magnitudes at first and second boundaries of a differential protection zone;

a control circuit responsive to the first and second differential current protection sensors to disable the generator when a differential current condition arises;

a half-wave rectifier circuit coupled to the phase conductors at a point within the differential protection zone;

a silicon controlled rectifier (SCR) coupled at one end to the rectifier circuit and further coupled at another end to the neutral conductor;

a resistor coupled across the SCR and developing a voltage representative of generator output voltage; and a zener diode coupled to the SCR and the generator for rendering the SCR conductive when the voltage across the resistor reaches a certain magnitude in response to a generator overvoltage condition to connect the generator to neutral potential and thereby limit load voltage and cause a differential current condition to arise, thereby resulting in disabling of the generator by the control circuit.

19. The circuit of claim 18, further including a capacitor coupled across the resistor and an inductor coupled in series with the SCR.

20. The circuit of claim 19, further including a test circuit for testing operability of the SCR including a transformer and a further resistor coupled to the SCR.

* * * * *